US007841010B2

(12) United States Patent
Lerouge et al.

(10) Patent No.: US 7,841,010 B2
(45) Date of Patent: Nov. 23, 2010

(54) SOFTWARE OR OTHER INFORMATION INTEGRITY VERIFICATION USING VARIABLE BLOCK LENGTH AND SELECTION

(75) Inventors: Julien Lerouge, Santa Clara, CA (US); Pierre Betouin, Fontenay-le-fleury (FR); Gianpaolo Fasoli, Palo Alto, CA (US); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 937 days.

(21) Appl. No.: 11/651,359

(22) Filed: Jan. 8, 2007

(65) Prior Publication Data

US 2008/0168564 A1  Jul. 10, 2008

(51) Int. Cl.
*G06F 7/04* (2006.01)
*G06F 17/30* (2006.01)
*H04N 7/16* (2006.01)
(52) U.S. Cl. .................... 726/26; 713/187
(58) Field of Classification Search .............. 341/64; 707/3, 1; 711/164; 713/189, 193, 187; 714/38; 726/26
See application file for complete search history.

(56) References Cited

U.S. PATENT DOCUMENTS

| | | | | |
|---|---|---|---|---|
| 5,382,955 A * | 1/1995 | Knierim | ..................... | 341/64 |
| 5,454,000 A | 9/1995 | Dorfman | | |
| 6,738,932 B1 * | 5/2004 | Price | ..................... | 714/38 |
| 7,225,341 B2 * | 5/2007 | Yoshino et al. | ............ | 713/193 |
| 2003/0018878 A1 | 1/2003 | Dorward et al. | | |
| 2003/0188117 A1 * | 10/2003 | Yoshino et al. | ............ | 711/164 |

(Continued)

FOREIGN PATENT DOCUMENTS

WO   WO-99/27450 A1   6/1999

(Continued)

OTHER PUBLICATIONS

Arvind Seshadri; verifying code integrity and enforcing untampered code execution on legacy systems; Year of Publication: 2005 ; pp. 1-16.*

(Continued)

*Primary Examiner*—Kambiz Zand
*Assistant Examiner*—Monjour Rahim
(74) *Attorney, Agent, or Firm*—Morrison & Foerster LLP

(57) ABSTRACT

An integrity verification process and associated apparatus to detect tampering or other alterations to computer code (software) or other computer files, and especially useful to detect tampering with code by hackers who might try to plant their own malicious code in the software. To make the verification process more robust versus hackers, each e.g., object code file to be protected is first selected using some sort of rule, then partitioned into variable length blocks or portions, the lengths varying in an unpredictable manner. Each portion has its checksum or hash value computed. An accompanying verification file is created which includes a vector for each portion including the portion's start address in memory, length, and the computed checksum or hash value. When the code is later to be run (executed) the verification file is conventionally read and each portion is verified by computing its checksum or hash value using the same algorithm as before, and comparing that to the value in the associated verification file vector. Lack of a match in the two values indicates tampering, so execution of the code can be halted.

10 Claims, 3 Drawing Sheets

U.S. PATENT DOCUMENTS

| | | | |
|---|---|---|---|
| 2003/0188231 A1 | 10/2003 | Cronce | |
| 2003/0200207 A1* | 10/2003 | Dickinson | 707/3 |
| 2003/0221116 A1* | 11/2003 | Futoransky et al. | 713/189 |
| 2004/0117616 A1 | 6/2004 | Silvester | |
| 2007/0156638 A1* | 7/2007 | Vadekar et al. | 707/1 |

FOREIGN PATENT DOCUMENTS

| | | |
|---|---|---|
| WO | WO-2006/116871 A2 | 11/2006 |
| WO | WO-2006/116871 A3 | 11/2006 |

OTHER PUBLICATIONS

European Search Report mailed on May, 9, 2008, for EP Application No. EP 08 15 0037, filed on Jan. 3, 2008, 2 pages.

International Search Report mailed on Jun. 20, 2008, for PCT Application No. PCT/US08/00169, filed on Jan. 3, 2008, 1 page.

Written Opinion mailed on Jun. 20, 2008, for PCT Application No. PCT/US08/00169, filed on Jan. 3, 2008, 4 pages.

European Examination Report mailed on Mar. 9, 2010, for EP Application No. EP 08 150 037.3, filed on Jan. 3, 1008, 3 pages.

International Preliminary Report on Patentability, mailed on Feb. 11, 2010, for PCT Application No. PCT/US2008/000169, filed on Jan. 3, 2008, 6 pages.

European Search Report mailed on May, 9, 2008, for EP Application No. EP 08 15 0037, filed on Jan. 3, 2008, 2 pages.

* cited by examiner

SOFTWARE OR OTHER INFORMATION INTEGRITY VERIFICATION USING VARIABLE BLOCK LENGTH AND SELECTION

FIELD OF THE INVENTION

This disclosure relates to integrity verification in the computer field, and more particularly to integrity verification using checksums or hashes.

BACKGROUND

Integrity verification is well known in the computer/cryptographic fields. Typical applications are to ensure that a message that is transmitted is received without being corrupted accidentally (due to errors caused by the communications channel) or maliciously such as by a hacker. The same verification techniques are used to make sure that the message (or other data including software programs) that has been stored, such as in computer memory, has not been similarly corrupted. Hackers corrupt computer data or software for two reasons: one is mere vandalism, to render the corrupted material worthless to its owner. The other is more subtle and important, in that hackers tend to tamper with the software programs ('code') of others by planting therein their own bits of code that allow the hackers to illicitly manipulate or use for their own purposes the tampered-with software.

An example of such tampering is that distributors of music and video content using the Internet or other computer networks do so using a Digital Rights Management system (DRM) to protect the content from illicit copying and use. DRM is used to protect digital content transferred over a network and transferred from a computer to an associated playback device. The DRM is implemented by software resident in the audio/video player or associated computer, and hence is available for tampering by a hacker, who thereby can "crack" the DRM and render it useless. For instance, the DRM tends to use cryptographic techniques to restrict usage to those who have been granted a right to the content, typically pieces of music or video programs, and cracking it may make the deciphering keys available to the hacker for unauthorized use of the content.

For many digital file transfer situations, a hacker who legitimately receives the content may try thereby to break the DRM protection scheme, so as to give illicit access to third parties. An identified weak link in DRM security is the overall process, rather than the encryption scheme itself. Thus hackers may try to corrupt the DRM software to gain illicit access to the content so it is for instance stripped of the encryption or other protective mechanisms, using the above described tampering approach.

Such corruption of computer/data files is a well known problem with a well known solution, known as integrity verification. This involves taking the file as a whole, or a fixed length part thereof, and computing a checksum or hash value for that part. A checksum is a form of redundancy check, and is a simple measure to protecting the integrity of data by allowing one to later detect errors in data sent through space (a communication) or time (stored and later retrieved.) It operates by adding up the values of the basic components of the file or part thereof (which are already in numerical, typically binary, form) and storing the resulting total value. Later, anyone can perform the same checksum operation on the data, compare the result to the authentic checksum, and if the totals match, conclude that the data was likely not corrupted. Simple checksums cannot detect many types of errors, such as reordering of portions of the data, inserting or deleting zero values, or multiple errors which sum to zero.

More sophisticated types of redundancy checks are known to overcome these weaknesses. Even they are not of much use against hackers, since their simple and known operations are easy to circumvent. To provide a higher level of integrity against hackers, the use of a cryptographic hash function (one way function) known as an HMAC (hash message authentication code) is well known in the field. Examples are MD5 (Message Digest version 5) and Secure Hash Algorithm 1 (SHA 1) generally referred to hereinafter as hash or hash functions. These are generally secure in a mathematical sense against hackers due to the complexity of the calculation of the hash value, which is used instead of the simpler checksum. However, like most advanced cryptographic techniques, such hash functions are computationally intensive thus being slow or requiring substantial computer performance, and while suitable for transmission and protection of high value material, may not be suitable for the commercial distribution of audio/video material which must be played on a compact and inexpensive dedicated player.

SUMMARY

This disclosure is directed to a method and apparatus for integrity verification, suitable for protection of computer software and other types of data files from tampering by hackers, and suitable for use in devices including computers but also including audio/video players, cell phones, PDAs, etc. which may have limited computing power. One application, as stated above, is to protect the integrity of the DRM code in such a device against having malicious code planted therein by a hacker. Hence when the protected code is executed, the verification process takes place and if the code has been tampered with, it stops executing. Of course, this requires that the code be accompanied by the requisite verification data.

The present method is in part conventional as explained above. The code (or other data) to be protected, before being stored in the host device (such as the media player) which will later execute it, is processed to provide the protection. This involves partitioning the code (typically at this point already in binary form, also known as object code) in portions for which a checksum or preferably a hash value is computed and stored. However, unlike in the usual checksum and hash techniques which are applied to standard length blocks of data, the portions here are not of equal length. Also, unlike prior techniques, not all portions are subject to verification. Instead, the user who is the programmer or designer of the DRM system sets criteria for deciding which files or portions of each file are subject to verification. The process thereby creates an integrity verification file associated with each data/code file, where the integrity verification file includes a list of entries, each entry including the beginning address in main memory of each verified portion, the length of the portion, and the checksum/hash value.

Thus each time a content or code file is accessed or a code file is executed, the system reads the associated integrity verification file and performs the integrity check on the actual file contents, to test for corruption, as is conventional for integrity verification.

DETAILED DESCRIPTION

Figure 1:
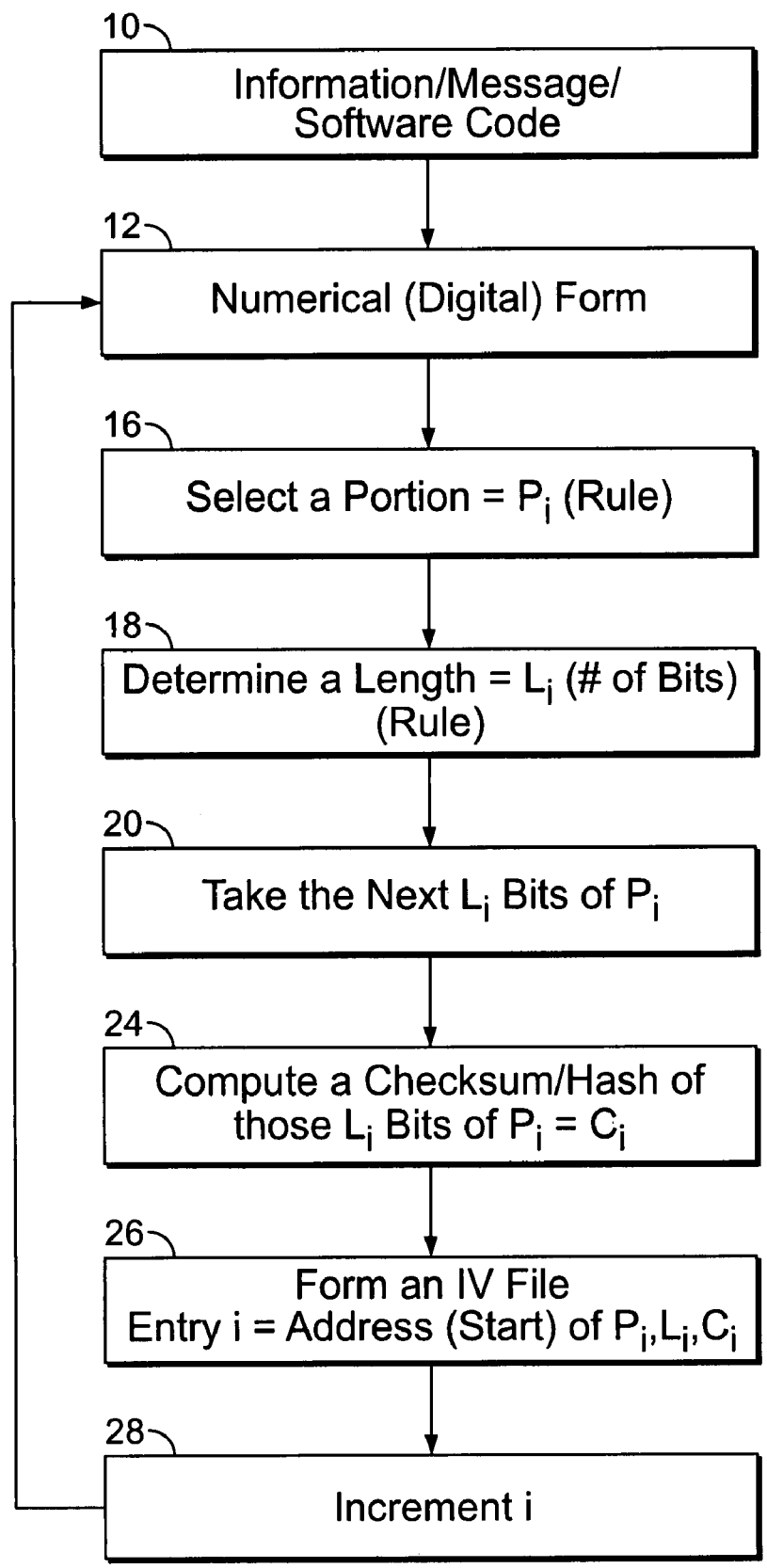
FIG. 1 shows in a flowchart the process of creating integrity verification information (e.g., a file) in accordance with the invention.

FIG. 1 shows in a flowchart a computer enabled process for creating integrity verification information so as to protect a computer file or part thereof in accordance with the invention. This process itself would be embodied in computer software, for instance using whatever computer language is used by the other application software being run on the host device such as other DRM code. It is assumed at step 10 that the information to be protected (a message which is data or computer code for instance) is pre-existing. At 12, the information is conventionally rendered into numerical (digital, typically binary) form; this would correspond in one embodiment to rendering the alphanumeric source code of a computer program into compiled binary form.

This process is applied to the compiled code, in its binary form. The tool (program) used to generate the integrity information takes the binary code file as input, and some debugging information or a link map to know where each part of the alphanumeric code is located in the binary code.

For example, assume a media player program is composed of the following source code files:
 gui.c (source code for the visual effects)
 io.c (source code for file/network interactions)
 drm.c (source code to handle decryption of content)
 decoder.c (source code to actually decode audio/video data)

The compiler/linker takes all those source code files as input and generates files player.exe and player.map. File player.exe contains the generated program in its binary form, player.map contains a link map, generated by the linker which tells where each part of the code is located in memory or in the binary. Note that instead of the map file, one could also use debugging information generated by the compiler, embedded in the binary usually. Now, assume the designer does not care if the input/output code or the GUI (graphical user interface) code is modified, but does care if the DRM code or the decoder code is, since that is much more important from a security standpoint.

The designer creates two rules, the first one is to checksum (or hash) any code that belongs to the file drm.c, and the second one is to checksum (or hash) any code that belongs to the file decoder.c. Here the rule is based on the file name, but it could also be based on the function name. For example, a rule could be to checksum only the function "foo" in the file drm.c. Rules are based on the filename, or the function names. A rule can also be a regular expression that will match several filenames of several function names. The tool generating the Integrity information parses the player.exe file, and helped by the map file or the debugging information, it identifies all the part of the code that need to be checksummed or hashed. For example, if the map files says that function "foo" in file drm.c is mapped at address 0x10000 and is 144 bytes long, the generating tool will parse the player.exe file locate those 144 bytes and will checksum them. Another useful rule is to limit the maximum length of the portion to be subject to the checksum or hash, to enhance performance (reducing processing time).

At 16, the selected binary information (e.g., a file) is partitioned into portions (blocks, but not of fixed length), and a first portion here designated Pi is selected. The length of each portion is set to vary. Hence both the selection of which portions (or files) are to be subject to the remainder of the process, and the length of each portion as determined at 18, are decided by the person performing the process (typically a computer software engineer), according to some predetermined criteria or rules. Note that the length of each portion varies, in some hard to predict way, to make it difficult to "crack" by hackers. The length of each portion is defined as some number of bits (or bytes or other convenient unit, here designated Li.

Next at 20, those Li bits of portion Pi are accessed. In 24, the predetermined checksum or hash function is applied to all the Li bits of Pi, to calculate the checksum or hash value Ci. Next at 26, an integrity verification (IV) file is created with a number of entries, one for each portion Pi. Each entry (or 'tuple' or vector in computer nomenclature) has three parts (fields): the address in the memory of the beginning of Pi, the length Li of Pi, and the checksum or hash value Ci. Then at 28, the value of i is incremented, and the process reentered at step 12, until the entire message/code file has been so processed. Thus the integrity verification file consists of all the concatenated IV vectors, which file then is stored.

Note that software (code) takes two main forms: source code, which is the alpha-numeric form as written by programmers and which is intelligible to people, and binary or object code, which is the compiled form of the source code and actually executed by a computer or processor. Since as described above, the human programmer decides which code portions are to be provided with integrity verification, he makes that decision based on the source code version, but the integrity verification process then must be applied to the binary version. Thereby, in accordance with the invention, a mapping between the source and binary code is provided, as part of the above process. There are several ways to do this, but exemplary well known methods use a link map or debugging symbols, which show explicitly where each part of the source code has been linked in the binary code.

The programmer can use a map file or debugging information. The map file is generated by the linker (ld or link.exe for example) and is stored on the computer hard disk usually. It is not created by the integrity verification tool. The map is only used for debugging purposes usually, and is not used by the compiler. Most of the time it is not used at all, and linkers usually do not generate one by default. Using it, software engineers can identify where in the source code a fault occurred for example.

Here is an example of map file content:
 01:09f86e0_initSharedGlobals 6e9f96e0 StdPlayer: StdPlayerRoutines.obj
 01:09f9470_drawStatusStuff 6e9fa470 StdPlayer: StdPlayerRoutines.obj
 01:09f9a90_getPseudoChapterMenuWidth 6e9faa90 StdPlayer:StdPlayerRoutines.obj
 01:09f9ba0_CalculateChapterCheckSum 6e9faba0 StdPlayer:StdPlayerRoutines.obj Reading this file, one can deduce:
 Function initSharedGlobals, at offset 0x009f86e0 in the text section of the binary is located at address 0x6e9f96e0 and is part of the StdPlayerRoutines.c[pp] file, compiled in the StdPlayer sub module.
 Function drawStatusStuff, at offset 0x009f9470 in the text section of the binary is located at address 0x6e9fa470 and is part of the StdPlayerRoutines.c[pp] file, compiled in the StdPlayer sub module.

If debugging information is used instead of the link map, then the same kind of deductions can be performed by parsing it. The debugging information can be embedded in the binary code or in a separate file (for respectively, for instance, the Apple Mac and other operating systems or the Windows operating system). For each platform, the debugging information has a well known format (PDB for Windows, DWARF or STABS for the Mac OS). The debugging information is generated by the compiler, whereas the link map is generated by the linker.

The entity that carries out the process of FIG. 1 is itself software code; so obviously it must be kept absolutely secure from hackers, and so typically would only be provided to those people entrusted with establishing security of the associated code, such as the DRM. The selection of the rules as to which code files or portions are subject to the FIG. 1 process may be arbitrary; for instance, the person using the process may decide to use it only for the more critical parts of the DRM.

Figure 2:
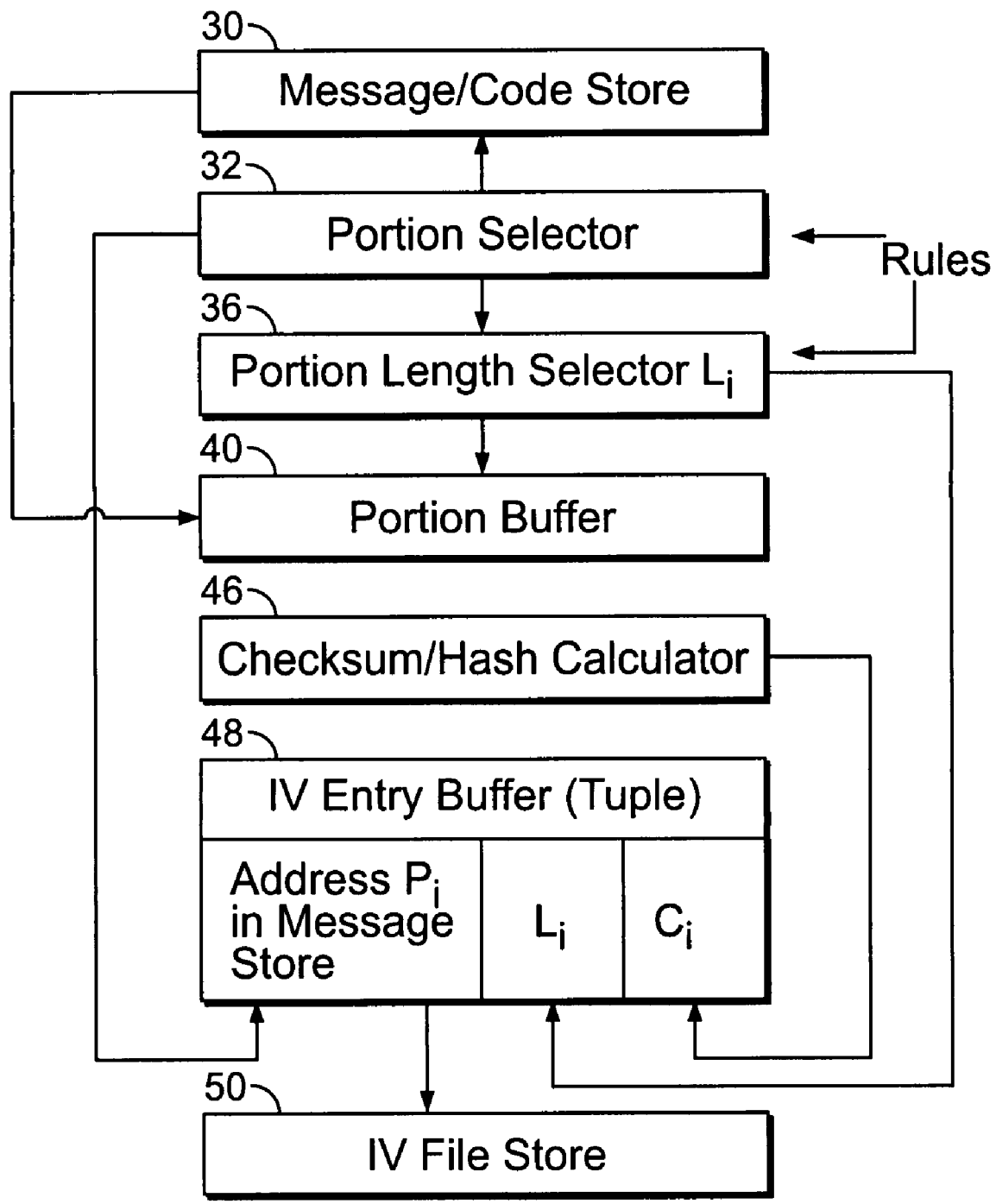
FIG. 2 shows an apparatus for carrying out the method of FIG. 1.

The associated apparatus which carries out the FIG. 1 process (typically a combination of conventional computer hardware and software elements) is shown in FIG. 2 and is typically part of a conventional computer, used by the programmer or software engineer who is rendering the integrity verification on software code. FIG. 2 (like FIG. 3) is of course only exemplary of a suitable apparatus. The message/code storage 30 is typically non-volatile memory such as a disk drive or flash memory resident in a conventional computer, the other conventional components of which are not shown for simplicity. Note the message/code storage 30 generally does not contain any source code. At this point, it only contains the binary code form of the program, with a link map or debugging symbols. The source code is not needed to generate the IV file. The source code is only needed by the programmer to create the rules that will be used by the IV tool. Storage 30 thus holds for instance the compiled (binary) code for which the programmer wants to provide integrity verification, and as pointed out this may be other data (a message) instead of code. Portion selector 32 is logic which downloads a first part Pi of the code from storage 30, under particular rules or decisions provided by the programmer. The rules or programmer also indicate the length Li of each portion or block to be operated on, by means of portion length selector 36.

The relevant portion Pi, of length Li, is then held in portion buffer 40, and loaded into checksum/hash calculator 46 to provide the checksum/hash value Ci. Value Ci is then loaded into the Ci field of IV entry (tuple or vector) buffer 48, the other fields of which are similarly loaded with values Li and the beginning address in storage 30 of portion Pi. Then, the entire contents of buffer 48 are loaded in the IV file store 50, concatenated with all such earlier determined IV vectors.

Figure 3:
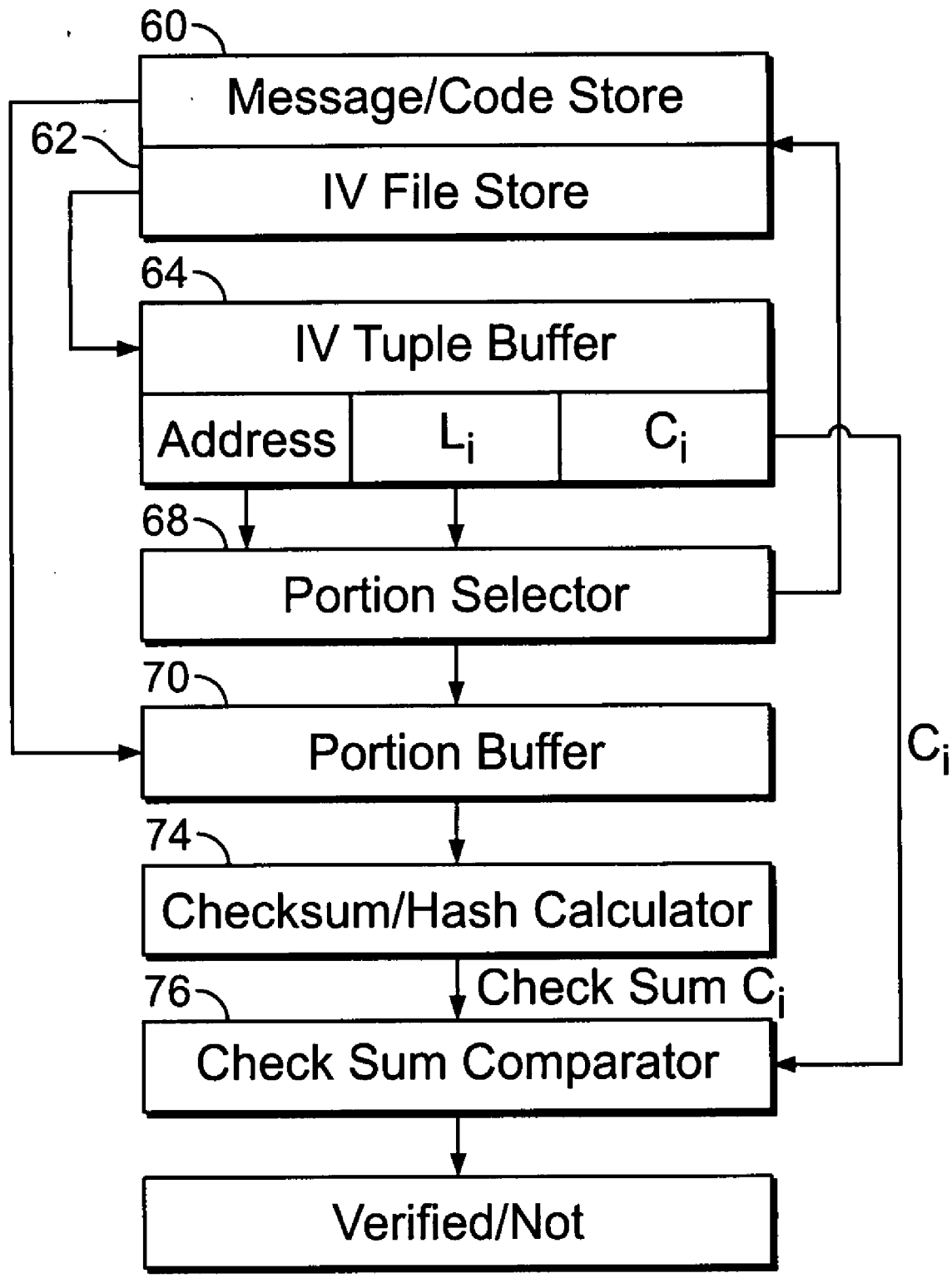
FIG. 3 shows an apparatus for carrying out the present integrity verification process.

FIG. 3 shows the complementary process and apparatus as carried out in for instance a media player or other type of playback apparatus (such as a computer, cell phone, or PDA) as part of the DRM scheme when the player is operating to play or download content subject to the present integrity verification protection. Hence FIG. 3 illustrates what would typically be carried out by a combination of relevant parts of the DRM code with the hardware conventionally present in the playback apparatus, the other parts of which are conventional and not illustrated. Note that the DRM code typically also includes many other protective features and aspects which are not shown, such as the conventional cryptographic protection mentioned above.

In FIG. 3, the playback apparatus includes a message (or code) storage 60, typically non-volatile memory, holding the protected code, for instance DRM code in compiled form. Associated with this is a storage 62 for the IV file. The contents of storage 62 are of course provided from storage 50 in FIG. 2. When the relevant code in storage 60 is to be executed, it is conventionally downloaded to e.g. random access memory associated with the processor which actually executes the code. At the same time, the first entry in IV file storage 62 is loaded into IV tuple (vector) buffer 64, with the three fields for each entry (vector) as in FIG. 2. Portion selector logic 68 reads the first two fields which are the address and length value Li, and proceeds to access message storage 60 to extract the code (of course, in compiled or binary form) form located beginning at that address and the next Li bits from storage 60.

This downloaded code is then loaded in to portion buffer 70, and transferred to checksum/hash calculator 74 which carries out the same operation as calculator 46 in FIG. 2, to determine the value Ci. This value Ci is then loaded into checksum comparator 76, to be compared with the other value Ci provided from buffer 64. If the values of Ci match, the integrity of the code portion is verified, and the code is executed; if the match fails, the code has been tampered with, so execution is prevented.

As well known in the computer field, a binary file may be subject to relocation in memory. For example, assume that software libraries A and B are both designed to load at particular address, and are both position dependent. As well known, position dependent means that the addresses are absolute in computer memory, not relative to a start address. A library in this context means a collection of subprograms used in modular fashion. Typically a library includes helper code and data. If a particular program is using both libraries A and B at the same time, then one of them must be moved in terms of its memory address. In order to move it, the host device's operating system must modify the code of the moved library dynamically. This of course would alter the computed checksum/hash value, hence it would cause the IV match to fail. To avoid this, the verification process of FIG. 3 is made to be relocation aware; so it includes a conventional step (not shown) that detects if such a relocation has taken place. If yes, the binary code is by a conventional step restored back to its original form before computing the checksum/hash value.

This disclosure is illustrative and not limiting; further modifications will be apparent to one skilled in the art in light of this disclosure, and are intended to fall within the scope of the appended claims.

We claim:

1. A computer enabled method for providing integrity verification for a file which is a binary computer code comprising the acts of:
   providing the file from a first storage;
   selecting a first portion of the file of a particular length;
   computing a hash value of data of the first portion;
   forming an a first entry including a start address in the first storage of the first portion, the length of the first portion, and the hash value;
   selecting a second portion of the file of a different length;
   computing a hash value of data of the second portion using a predetermined hash function;
   forming a second entry including the start address in the first storage of the second portion, the length of the second portion, and the hash value of the second portion;
   concatenating the first and second entries to form a verification file;
   storing the verification file in a second storage; and
   providing a map file created by a compiler and which maps between the binary code and a source code version of the binary code.

2. The method of claim 1, further comprising the act of selecting the second portion to be not immediately contiguous with the first portion in the storage.

3. Computer enabled apparatus for carrying out the method of claim 1.

4. A computer enabled method of verifying the integrity of a file which is a binary computer code and having an associated verification file, the method comprising the acts of:
   providing the file from a first storage;
   reading a first entry of the verification file into a second storage, the entry including a start address of a first portion of the file in the first storage, the length of the first portion, and a hash value of data of the first portion;
   for the first portion, computing a hash value of its data using a predetermined hash function;
   comparing the computed hash value with in the first entry;
   verifying the file integrity only if the hash values match; and
   providing a map file created by a compiler and which maps between the binary code and a source code version of the binary code.

5. The method of claim 4, further comprising repeating the acts of comparing and verifying for a second portion of the file and its associated entry in the verification file, the second portion having a length different from that of the first portion.

6. The method of claim 4, further comprising the acts of:
   determining if the file has been subject to relocation in the storage; and
   if the file has been subject to relocation, restoring the first portion to its form prior to relocation before the act of computing.

7. Computer enabled apparatus for carrying out the method of claim 4.

8. The method of claim 5 wherein the second portion is not immediately contiguous with the first portion in the storage.

9. Apparatus for providing the integrity of a data file which is binary computer code, comprising:
   storage for the file;
   a portion selector logic coupled to the storage;
   a portion length selector;
   a portion buffer coupled to the storage and to the selector logic for storing a portion of the file, wherein the length of the stored portion varies from portion to portion;
   a hash value calculator in a processor coupled to the portion buffer and which calculates a checksum or hash value of data of the portion in the buffer using a predetermined hash function;
   an entry buffer coupled to the calculator and to the portion length selector and to the portion selector logic and which stores a start address of the portion in the storage, a length of the portion, and the computed hash value;
   a verification storage coupled to the entry buffer and which stores an entry for each of a plurality of portions of the file received from the entry buffer; and
   storage of a map file created by a compiler and which maps between the binary code and a source code version of the binary code.

10. Apparatus for verifying integrity of a file which is a binary computer code, comprising:
   a file storage and an associated verification file storage;
   an entry buffer coupled to the verification file storage, which receives from the verification file storage an entry for a portion of a file in the file storage, the entry including a start address of the portion, a length of the portion, and a hash value of data of the portion;
   a portion selector coupled to the entry buffer and which selects from the file storage the portion associated with the entry held in the entry buffer;
   a portion buffer coupled to the file storage and the portion selector and which holds the selected portion;
   a hash value calculator coupled to the portion buffer and which computes a hash value of data of the selected portion using a predetermined hash function;
   a comparator coupled to the entry buffer and the calculator, and which compares the hash values thereby to verify the integrity of the file; and
   storage of a map file created by a compiler and which maps between the binary code and a source code version of the binary code.

* * * * *

UNITED STATES PATENT AND TRADEMARK OFFICE
CERTIFICATE OF CORRECTION

| | | |
|---|---|---|
| PATENT NO. | : 7,841,010 B2 | Page 1 of 1 |
| APPLICATION NO. | : 11/651359 | |
| DATED | : November 23, 2010 | |
| INVENTOR(S) | : Julien Lerouge et al. | |

It is certified that error appears in the above-identified patent and that said Letters Patent is hereby corrected as shown below:

In column 6, line 50, in Claim 1, delete "an a first" and insert -- a first --, therefor.

In column 8, line 2, in Claim 9, delete "or hash" and insert -- hash --, therefor.

Signed and Sealed this
Twenty-fifth Day of October, 2011

David J. Kappos
*Director of the United States Patent and Trademark Office*